Patented July 16, 1946

2,404,319

UNITED STATES PATENT OFFICE 2,404,319

BUTANOLAMINE SALTS OF THEOPHYLLINE

Robert S. Shelton, Mariemont, Ohio, assignor to The Wm. S. Merrell Company, Reading, Ohio, a corporation of Delaware No Drawing. Application June 28, 1941, Serial No. 400,345

3 Claims. (Cl. 260—253)

This invention relates to new derivatives of theophylline, and more particularly to the theophylline butanolamines, which have important advantages for therapeutic use, i. e., the administration of theophylline. They are extremely water-soluble, well tolerated and quite free from side reactions when administered.

Theophylline is an important therapeutic agent, largely used for certain heart conditions. Theophylline itself is very slightly soluble in water, and is customarily used in the form of a salt. Aminophyllin, the water-soluble compound of theophylline with ethylene diamine, is very widely used, but even this product has relatively limited water solubility. Furthermore, tablets of this product discolor very quickly, and solutions of it, distributed in ampoules, frequently precipitate theophylline. Other salts of theophylline, such as the piperizine salts, the ethanolamine salts and the isopropanolamine salts have been proposed, but have never been as widely used as Aminophyllin.

In accordance with the present invention, the compounds of theophylline with the butanolamines, and particularly 2-amino-butanol and 2-amino-2-methyl-1-propanol are provided. These salts are extremely water-soluble, the 2-amino-2-methyl-1-propanol salt having a solubility in the neighborhood of 55% of water. In addition to this property of extreme water solubility, the new compounds are stable. In tablet form, they do not discolor as does Aminophyllin, and solutions, for example, in ampoules, do not precipitate theophylline, even though concentrated beyond any concentration heretofore used with the known compounds of theophylline.

The new compounds are readily prepared, for example, by dissolving equimolecular proportions of theophylline and the amino-butanol in water and evaporating until crystallization is almost complete. Purification by recrystallization is difficult, because of hydrolysis, but by following the procedure described, the new salts are readily prepared as white crystalline substances of fixed composition, stable at ordinary temperatures, and which do not decompose, discolor or develop odors. Also, these crystalline materials are non-hygroscopic, and accordingly, are of further value for distribution in the form of tablets.

The new derivatives may be administered orally or parenterally. They are comparatively well tolerated and quite free from undesirable side effects.

The invention will be further illustrated by the following specific example, but it is not limited thereto.

*Example.*—Preparation of the 2-amino-2-methyl-1-propanol salt of theophylline. Equimolecular proportions of theophylline and 2-amino-2-methyl-1-propanol are dissolved in water and the water is evaporated until crystallization is almost complete. The crystals are filtered off, and dried. The product has a melting point of 254–256° C., softening at 245° C. It has a water solubility of about 55%. It may be compounded in the form of tablets, for oral administration, or may be prepared in solution, for distribution in ampoules. For the manufacture of solutions for packaging in ampoules, it is more convenient to simply dissolve the theophylline and the butanol amine in water, without going through the intermediate step of separating the crystalline salt. Thus, for example, for preparing an ampoule solution containing .48 gram of the salt for each 2 cc. of water, for packaging in ampoules, it is simply necessary to dissolve 100 grams of theophylline and 46 grams of 2-amino-2-methyl-1-propanol in sufficient ampoule water to make 600 cc. of solution, filter the solution and fill it into 2 cc. ampoules. These ampoules may then be sterilized by heating at 100° C. for 30 minutes for three consecutive days, or in other appropriate ways. They form a very convenient way of administering theophylline parenterally. The solutions are stable, and do not precipitate theophylline on standing.

The 2-amino-2-methyl-1-propanol salt of the example is a particularly valuable salt of theophylline for therapeutic purposes. The 2-aminobutanol salt, which is readily prepared in the same way, also exhibits the high water solubility, stability, and freedom from discoloration and development of odors which are desirable in a therapeutic product. Other butanolamine salts, such as the salt of theophylline with tris-(hydroxymethyl)-amino-methane and hydroxyethyl-ethylene-diamine may be prepared in similar fashion, and are included within the scope of the invention.

I claim:

1. The butanolamine salts of theophylline prepared for use as a therapeutic.
2. The 2-aminobutanol salt of theophylline prepared for use as a therapeutic.
3. The theophylline salt of 2-methyl-2-aminopropanol-1 prepared for use as a therapeutic agent.

ROBERT S. SHELTON.